United States Patent
DeBlasi et al.

(10) Patent No.: US 9,091,375 B1
(45) Date of Patent: Jul. 28, 2015

(54) ABRASION-RESISTANT BRAIDED HOSE

(71) Applicants: Italo DeBlasi, Pierson, FL (US); Josif Atanasoski, Ormond Beach, FL (US)

(72) Inventors: Italo DeBlasi, Pierson, FL (US); Josif Atanasoski, Ormond Beach, FL (US)

(73) Assignee: Microflex, Inc., Ormond Beach, FL (US)

( * ) Notice: Subject to any disclaimer, the term of this patent is extended or adjusted under 35 U.S.C. 154(b) by 0 days.

(21) Appl. No.: 14/549,939

(22) Filed: Nov. 21, 2014

Related U.S. Application Data

(60) Provisional application No. 62/033,370, filed on Aug. 5, 2014.

(51) Int. Cl.
*F16L 11/10* (2006.01)
*F16L 11/08* (2006.01)

(52) U.S. Cl.
CPC ..................... *F16L 11/088* (2013.01)

(58) Field of Classification Search
CPC ....... F16L 11/085; F16L 11/087; F16L 11/15; F16L 33/20; F16L 33/2076
USPC ................ 138/123–126, 129, 140, 137, 141, 138/DIG. 3, 135, 143
See application file for complete search history.

(56) References Cited

U.S. PATENT DOCUMENTS

| 3,023,787 | A |   | 3/1962  | Phillips et al. |         |
|-----------|---|---|---------|-----------------|---------|
| 3,190,315 | A |   | 6/1965  | Taylor et al.   |         |
| 3,654,967 | A |   | 4/1972  | Atwell et al.   |         |
| 3,857,415 | A | * | 12/1974 | Morin et al.    | 138/122 |
| 4,137,949 | A | * | 2/1979  | Linko et al.    | 138/125 |
| 4,190,088 | A | * | 2/1980  | Lalikos et al.  | 138/126 |
| 4,259,989 | A | * | 4/1981  | Lalikos et al.  | 138/109 |
| 4,259,991 | A | * | 4/1981  | Kutnyak         | 138/127 |
| 4,488,577 | A | * | 12/1984 | Shilad et al.   | 138/127 |
| 4,675,221 | A | * | 6/1987  | Lalikos et al.  | 138/110 |
| 5,381,511 | A |   | 1/1995  | Bahar et al.    |         |
| 5,507,320 | A | * | 4/1996  | Plumley         | 138/126 |
| 5,782,270 | A | * | 7/1998  | Goett et al.    | 138/109 |
| 5,931,200 | A | * | 8/1999  | Mulvey et al.   | 138/109 |
| 6,302,152 | B1|   | 10/2001 | Mulligan        |         |
| 6,334,466 | B1|   | 1/2002  | Jani et al.     |         |
| 7,114,526 | B2| * | 10/2006 | Takagi et al.   | 138/127 |
| 7,588,057 | B2|   | 9/2009  | Bentley         |         |
| 2005/0211325 | A1 | * | 9/2005 | Takagi et al. | 138/121 |

* cited by examiner

*Primary Examiner* — Patrick F Brinson
(74) *Attorney, Agent, or Firm* — Livingston Loeffler, P.A.; Edward M. Livingston, Esq.; Bryan L. Loeffler, Esq.

(57) ABSTRACT

An abrasion-resistant braided hose (1) having an abrasion-resistant layer (4) located between an inner hose (2) and a braiding covering (3). The abrasion-resistant layer is preferably a strip of Teflon® helically or spirally wrapped around the inner hose to allow for flexibility or a stripwound interlocking hose. The abrasion-resistant layer reduces the amount of friction between the inner hose and the braided covering, thereby reducing the likelihood of the inner hose rupturing and failing.

6 Claims, 2 Drawing Sheets

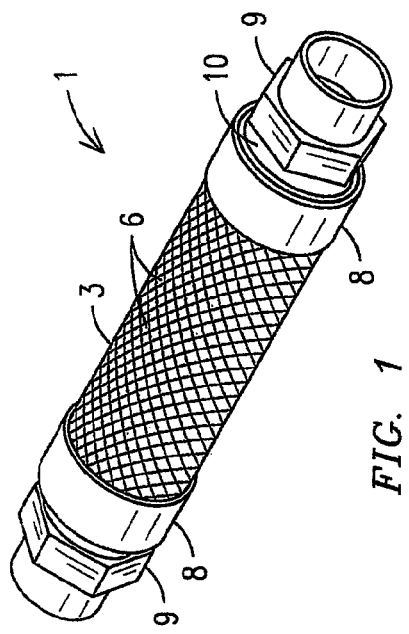
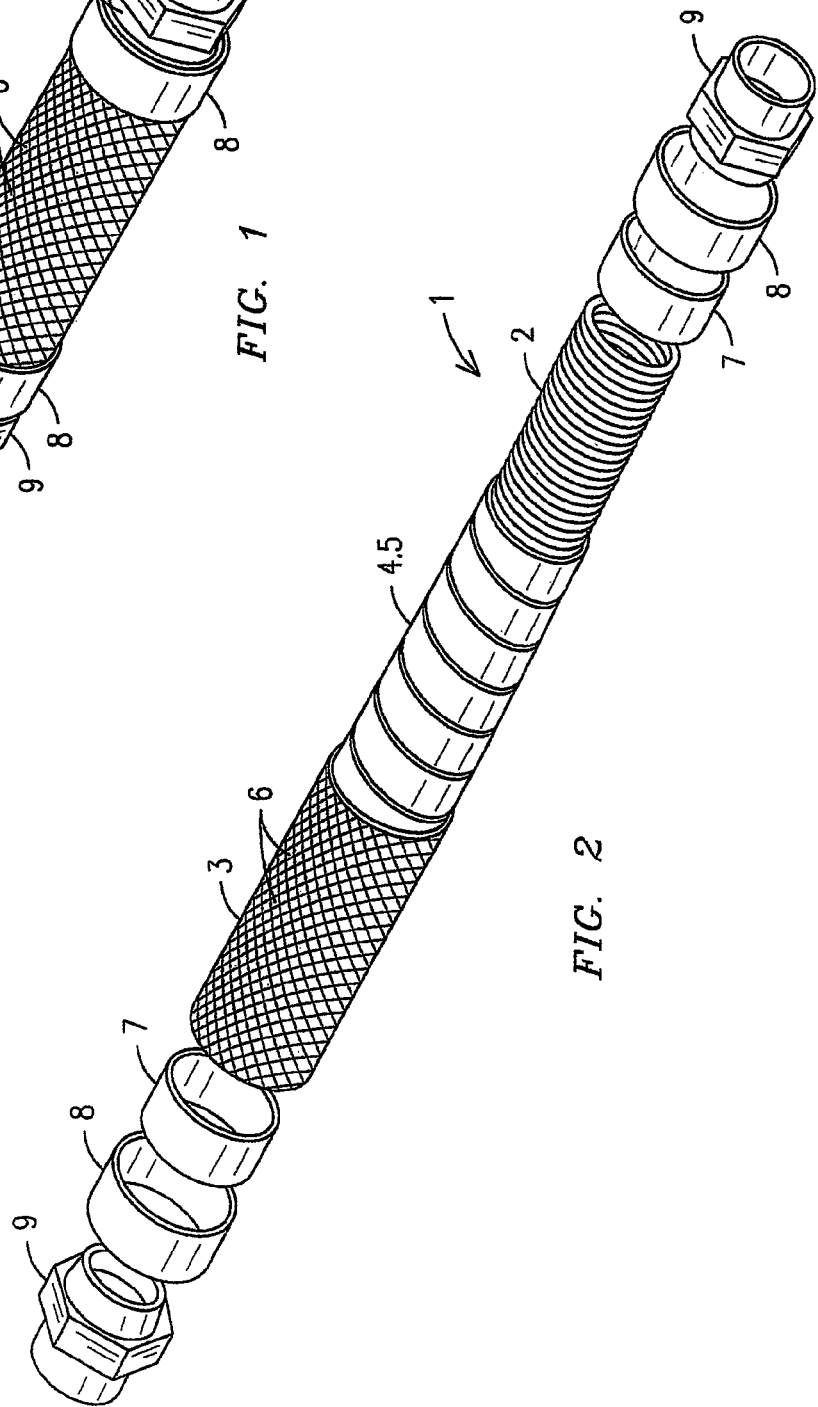

ABRASION-RESISTANT BRAIDED HOSE

CROSS-REFERENCE TO RELATED APPLICATION

This application claims priority to application No. 62/033,370, filed on Aug. 5, 2014, which is currently pending. The patent application identified above is incorporated herein by reference in its entirety to provide continuity of disclosure.

FIELD OF THE INVENTION

This invention relates to braided hoses and more particularly a hose having an abrasion-resistant middle layer located between a braided covering and an inner hose to protect the inner hose from ruptures caused from abrasions.

BACKGROUND OF THE INVENTION

Braided hoses are commonly used in industrial and other type applications as supply, drainage and/or exhaust lines. Such hoses normally have an inner hose made of rubber or metal (such as corrugated hoses) with an outer layer of braided metal threads. The threads may also be made of other material depending on the intended use of the hose and economic considerations.

Couplings are preferably located on each end of the hose. The method by which the braiding is attached to the couplings or connection fittings depends on the type of fitting and the demands on the hose.

The main purpose of braiding is to increase pressure resistance in the hose. Due to its inherent flexibility, the braiding moulds itself to the movement of the hose. Hose braiding consists of wrapped wire bundles that are alternately layered one over the other. This not only prevents hose lengthening due to internal pressure, but also absorbs external tensile forces and protects the outside of the hose. The braiding also greatly increases the resistance of the hose to internal pressure.

However, the constriction of the braiding upon the inner hose combined with rubbing caused when the braiding restrains the inner hose from elongation while the hose is under pressure and can cause the hose to rupture and fail.

Therefore, a need exists for an abrasion-resistant braided hose wherein the structural integrity of the inner hose is not compromised by the braiding surrounding the inner hose.

The relevant prior art includes the following references:

| Patent No. | Inventor (U.S. Pat. References) | Issue/Publication Date |
| --- | --- | --- |
| 3,023,787 | Phillips et al. | Mar. 6, 1962 |
| 3,190,315 | Taylor et al. | Jun. 22, 1965 |
| 3,564,967 | Atwell et al. | Apr. 11, 1972 |
| 5,381,511 | Bahar et al. | Jan. 10, 1995 |
| 6,302,152 | Mulligan | Oct. 16, 2001 |
| 6,334,466 | Jani et al. | Jan. 1, 2002 |
| 7,588,057 | Bentley | Sep. 15, 2009 |

SUMMARY OF THE INVENTION

The primary object of the present invention is to provide an abrasion-resistant braided hose wherein the structural integrity of the inner hose is not compromised by the braiding surrounding the inner hose.

The present invention fulfills the above and other objects by providing an abrasion-resistant braided hose having an anti-abrasion layer located between an inner hose and a braiding covering. The abrasion-resistant layer is preferably a strip of Teflon® helically or spirally wrapped around the inner hose to allow for flexibility or may be a stripwound interlocking hose. The abrasion-resistant layer reduces the amount of friction between the inner hose and the braided covering, thereby reducing the likelihood of the inner hose rupturing and failing, especially in situations where the abrasion-resistant braided hose is exposed to high vibrations and/or pulsating environments, for example, in use with compressors, reciprocating engines and so forth.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a perspective side view of an abrasion-resistant braided hose of the present invention;

FIG. 2 is an exploded perspective side view of an abrasion-resistant braided hose of the present invention.

DESCRIPTION OF THE PREFERRED EMBODIMENTS

Figure 3:
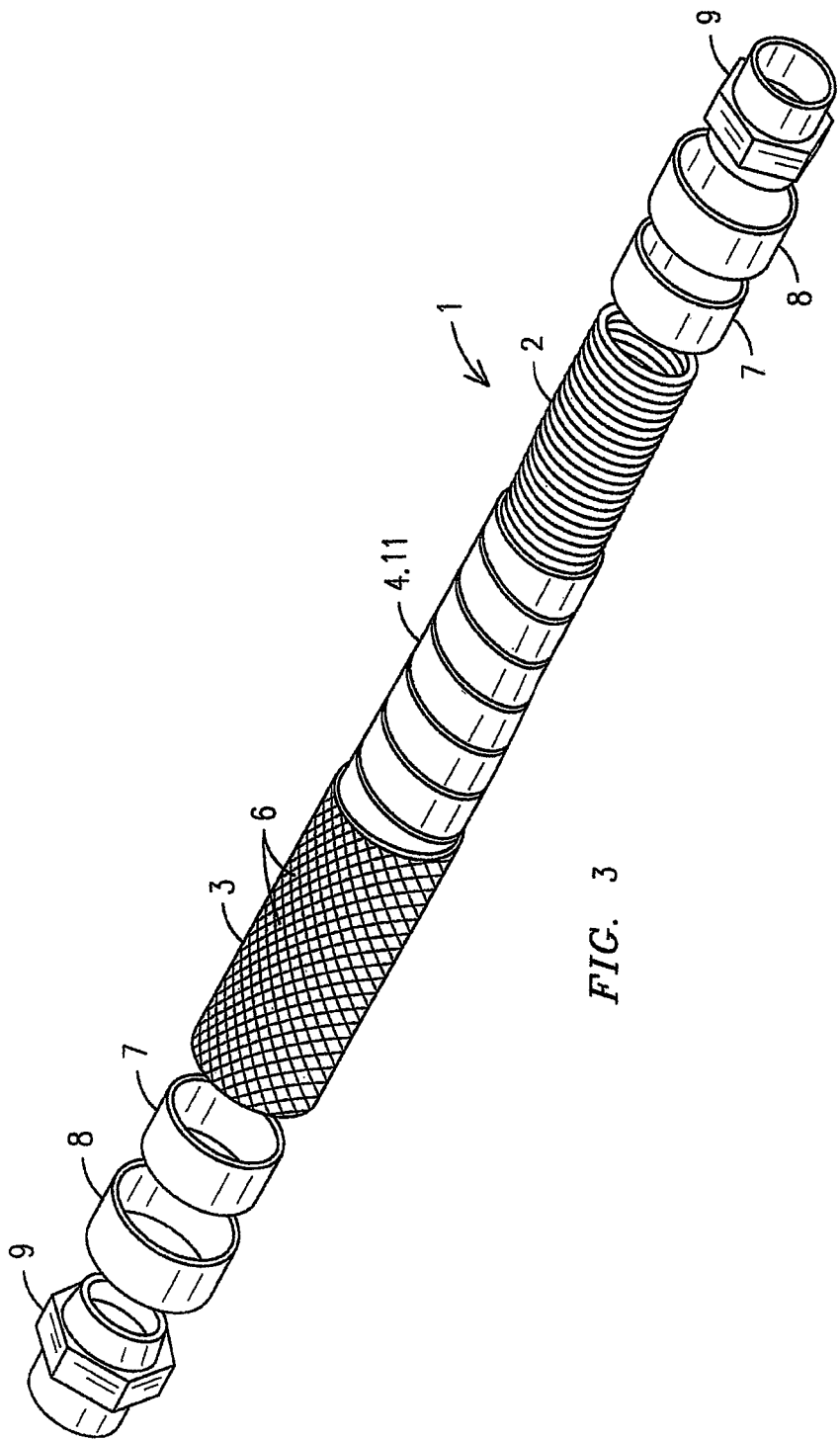
FIG. 3 is an exploded perspective side view of an abrasion-resistant braided hose of the present invention having a stripwound interlocking hose as an abrasion-resistant middle layer.

For purposes of describing the preferred embodiment, the terminology used in reference to the numbered components in the drawings is as follows:

1. abrasion-resistant braided hose, generally
2. inner hose
3. braided covering
4. abrasion-resistant middle layer
5. tape
6. individual band
7. inner rings
8. braid rings
9. end fittings
10. seal
11. stripwound interlocking hose With reference to FIG. 1 and FIG. 2, a perspective side view and an exploded perspective side view, respectively, of an abrasion-resistant braided hose 1 of the present invention are illustrated. The abrasion-resistant braided hose 1 comprises an inner hose 2, which may be a rubber hose, a metal hose, a strip wound hose, a corrugated hose (as illustrated here) or other types of hose. An outer braided covering 3 comprised of a plurality of braided threads surrounds the inner hose 2. An abrasion-resistant middle layer 4 is located between the braided covering 3 and the inner hose 2. The abrasion-resistant middle layer 4 is preferably a polytetrafluoroethylene, such as Teflon®, or other material that reduces friction between the inner hose 2 and the braided covering 3. As illustrated in FIG. 2, the abrasion-resistant middle layer 4 is an elongated strip of tape 5 wrapped around the inner hose 2, thereby separating the inner hose 2 from the braided covering 3. The elongated strip of tape 5 is wrapped in a helical or spiral pattern around the inner hose 2. The abrasion-resistant middle layer 4 may also have a coating of additional lubricant on an outer surface to further reduce friction between the inner hose 2, and the braided covering 3. The abrasion-resistant middle layer 4 may also be a strip-wound interlocking hose 11, as illustrated in FIG. 3.

The assembly of the abrasion-resistant braided hose 1 is accomplished by cutting the inner hose 2 to a desired length. In addition, individual bands 6 of the braided covering 3 are cut to an appropriate length to be braided around the cut inner hose 2. The tape 5 forming the abrasion-resistant middle layer 4 is then wound around the inner hose 2 in a spiral fashion leaving space for inner rings 7 to be connected to ends of the inner tube 2. The inner rings 7 are then connected or swaged in place to the ends of the inner hose 2. The braided covering 3 is then placed over the abrasion-resistant middle layer 4. Then, braid rings 8 are placed over ends of the braided covering 3 and the ends of the abrasion-resistant braided hose 1 are sealed preferably by seals 10, such as welds. End fittings 9, such as a threaded end fittings, flanged end fittings, welded end fittings and so forth, are then secured to the ends of the abrasion-resistant braided hose 1, preferably by welding.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, we claim:

1. An abrasion-resistant braided hose comprising:
an elongated inner hose having two ends;
an outer braided covering surrounding the inner hose;
an abrasion-resistant middle layer located between the braided covering and the inner hose; and
the abrasion-resistant middle layer is a stripwound interlocking hose.

2. An abrasion-resistant braided hose comprising:
an elongated inner hose having two ends;
an outer braided covering surrounding the inner hose;
an abrasion-resistant middle layer located between the braided covering and the inner hose; and
the abrasion-resistant middle layer has a coating of lubricant.

3. An abrasion-resistant braided hose comprising:
an elongated inner hose having two ends;
an outer braided covering surrounding the inner hose;
an abrasion-resistant middle layer located between the braided covering and the inner hose;
inner rings connected to the ends of the inner hose; and
the abrasion-resistant middle layer located between the braided covering and the inner hose terminates a predetermined distance from the ends of the inner hose to leave space for the inner rings to be connected to the ends of the inner hose.

4. An abrasion-resistant braided hose comprising:
an elongated inner having two ends;
an outer braided covering surrounding the inner hose;
an abrasion-resistant middle layer located between the braided covering and the inner hose;
the abrasion-resistant middle layer is an elongated strip of tape wrapped in a spiral pattern around the inner hose; and
the abrasion-resistant middle layer is a stripwound interlocking hose.

5. An abrasion-resistant braided hose comprising:
an elongated inner having two ends;
an outer braided covering surrounding the inner hose;
an abrasion-resistant middle layer located between the braided covering and the inner hose;
the abrasion-resistant middle layer is an elongated strip of tape wrapped in a spiral pattern around the inner hose; and
the abrasion-resistant middle layer has a coating of lubricant to further reduce friction between the inner hose and the braided covering.

6. An abrasion-resistant braided hose comprising:
an elongated inner having two ends;
an outer braided covering surrounding the inner hose;
an abrasion-resistant middle layer located between the braided covering and the inner hose;
the abrasion-resistant middle layer is an elongated strip of tape wrapped in a spiral pattern around the inner hose;
inner rings connected to the ends of the inner hose; and
the abrasion-resistant middle layer located between the braided covering and the inner hose terminates a predetermined distance from the ends of the inner hose to leave space for the inner rings to be connected to the ends of the inner hose.

\* \* \* \* \*

UNITED STATES PATENT AND TRADEMARK OFFICE
CERTIFICATE OF CORRECTION

PATENT NO. : 9,091,375 B1
APPLICATION NO. : 14/549939
DATED : July 7, 2015
INVENTOR(S) : Italo DeBlasi and Josif Atanasoski It is certified that error appears in the above-identified patent and that said Letters Patent is hereby corrected as shown below:

In the Claims

Column 4, lines 11-44, please amend Claims 4, 5 and 6 as follows:

4. An abrasion-resistant braided hose comprising:
an elongated inner hose having two ends;
an outer braided covering surrounding the inner hose;
an abrasion-resistant middle layer located between the braided covering and the inner hose;
the abrasion-resistant middle layer is an elongated strip of tape wrapped in a spiral pattern around the inner hose; and
the abrasion-resistant middle layer is a stripwound interlocking hose.
5. An abrasion-resistant braided hose comprising:
an elongated inner hose having two ends;
an outer braided covering surrounding the inner hose;
an abrasion-resistant middle layer located between the braided covering and the inner hose;
the abrasion-resistant middle layer is an elongated strip of tape wrapped in a spiral pattern around the inner hose; and
the abrasion-resistant middle layer has a coating of lubricant to further reduce friction between the inner hose and the braided covering.
6. An abrasion-resistant braided hose comprising:
an elongated inner hose having two ends;
an outer braided covering surrounding the inner hose;
an abrasion-resistant middle layer located between the braided covering and the inner hose;
the abrasion-resistant middle layer is an elongated strip of tape wrapped in a spiral pattern around the inner hose;
inner rings connected to the ends of the inner hose; and
the abrasion-resistant middle layer located between the braided covering and the inner hose terminates a predetermined distance from the ends of the inner hose to leave space for the inner rings to be connected to the ends of the inner hose.

Signed and Sealed this
Ninth Day of August, 2016

Michelle K. Lee
*Director of the United States Patent and Trademark Office*